United States Patent [19]

Bryan

[11] Patent Number: 4,996,021
[45] Date of Patent: Feb. 26, 1991

[54] BOTTOM NOZZLE TO GUIDE TUBE CONNECTION

[75] Inventor: William J. Bryan, Granby, Conn.

[73] Assignee: Combustion Engineering, Inc., Windsor, Conn.

[21] Appl. No.: 529,406

[22] Filed: May 29, 1990

[51] Int. Cl.⁵ .............................................. G21C 3/32
[52] U.S. Cl. .................................. 376/446; 376/353; 376/451
[58] Field of Search ............... 376/446, 434, 443, 353, 376/451

[56] References Cited

U.S. PATENT DOCUMENTS

| | | | |
|---|---|---|---|
| 4,070,239 | 1/1978 | Bevilacqua | 376/446 |
| 4,381,284 | 4/1983 | Gjertsen | 376/364 |
| 4,668,469 | 5/1987 | Widener | 376/446 |
| 4,717,529 | 1/1988 | Merkovsky | 376/245 |
| 4,738,820 | 4/1988 | Wilson | 376/446 |

Primary Examiner—Donald P. Walsh
Attorney, Agent, or Firm—John H. Mulholland

[57] ABSTRACT

A pressurized water reactor fuel assembly (10) has a fastener or bolt (40) of stainless steel with a longitudinal groove (48) attaching zircaloy guide tubes (16) to stainless steel lower end fitting (14). The guide tubes have internally threaded zircaloy plugs (52) for mating with the threads (46) of bolt (40) with points (50) created in the threads (46) by groove (48) providing increased friction. The groove (48) acts to accommodate stresses set up by differential thermal expansion of zircaloy and stainless steel. Apertured stainless steel cups (60) receive the plugged ends of guide tubes (16) to capture them and provide connections to lower grid (22) of stainless steel.

9 Claims, 2 Drawing Sheets

BOTTOM NOZZLE TO GUIDE TUBE CONNECTION

FIELD OF THE INVENTION:

This invention relates to nuclear reactor fuel assemblies for Pressurized Water Reactors (PWR) and in particular those assemblies which include spaced fuel rod support grids mounted in a reactor core as a unit. The fuel rods are held between an upper end fitting or top nozzle and a lower end fitting or bottom nozzle by means of spacer grids. Guide tubes or thimbles provide the structural integrity between the lower end fitting, the upper end fitting and the spacer grids intermediate the ends of the fuel assembly.

BACKGROUND OF THE INVENTION:

An attachment of the guide tubes to the lower end fittings is illustrated in U.S. Pat. No. 4,738,820.

The guide tubes have plugs in their lower ends to facilitate attachment to the lower end fittings. The guide tubes and plugs are of zircaloy, an alloy of zirconium. The lower end fittings and cups attached thereto to receive the plugged lower ends of the guide tubes are of stainless steel, such as that known as 304. The cup acts as a mounting sleeve for the lowest grid which is also of a stainless steel, such as Inconel 625 or 718. The other grids are of zircaloy.

Since the coefficient of expansion of zircaloy and stainless steels such as 304 and Inconel 625 or 718 are significantly different, attachments between zircaloy and stainless steel elements of a structure must accommodate the tendency of the elements to move at relatively different times, rates and magnitudes. Accordingly, attachments of these elements for structures which will maintain their integrity over time are difficult. For example, fuel assemblies may be used in a nuclear reactor, typically, for as many as three cycles of eighteen (18) months each. Many temperature cycles which potentially weaken bottom nozzle to guide tube connections occur during this period of time.

SUMMARY OF THE INVENTION:

In a fuel assembly having a stainless steel bottom nozzle or lower end fitting to zircaloy guide tube attachment constructed according to the principals of the invention, each zircaloy guide tube has a zircaloy lower end plug. A threaded central passageway in the guide tube plug receives a stainless steel threaded fastener which attaches the plugged tube and a tube receiving stainless steel cup or mounting sleeve to the lower end fitting.

The stainless steel faster is an externally threaded bolt having a first end threadably received in the threaded central passageway of the plug in the lower end of the guide tube and a head at its other end in a countersunk hole on the side of the lower end fitting opposite said guide tube. An interruption is provided in the external threads of the bolt which forms a groove communicating the interior of the guide tube with the side of the lower end fitting opposite said guide tube and enhancing its frictional engagement with said threaded central passageway, thereby to hold and attach said guide tube and lower end fitting firmly together, even through a series of temperature cycles.

Normally, the plug end receiving stainless steel cup with a fastener opening is secured between the zircaloy plugged guide tube end and the stainless steel lower end fitting. This fully accommodates the temperature expansion differences between zircaloy and stainless steel and provides a better attachment. The groove in the stainless steel fastener, permits lower end fitting fuel assembly reconstitution and provides for coolant flow through the end of the guide tube. These functions are accommodated with the advantage that the longitudinal slot or groove in the threads provides points of increased friction and holding power in the threaded connection and provide "give" for the zircaloy—stainless steel thermal expansion difference. The mean coefficient of thermal expansion $\times 10^2$ (cm./cm./° C.) in going from 70° F. to 650° C. or 21.1° C. to 343.3° C. for zircaloy-4 and 304 stainless steel are typically as follows:

| | |
|---:|:---|
| zircaloy-4: | 2.93 in./in./°F. or 5.27 cm./cm./°C. |
| austenitic stainless steel: | 9.87 in./in./°F. or 17.77 cm./cm./°C. |

Figures 1, 2:
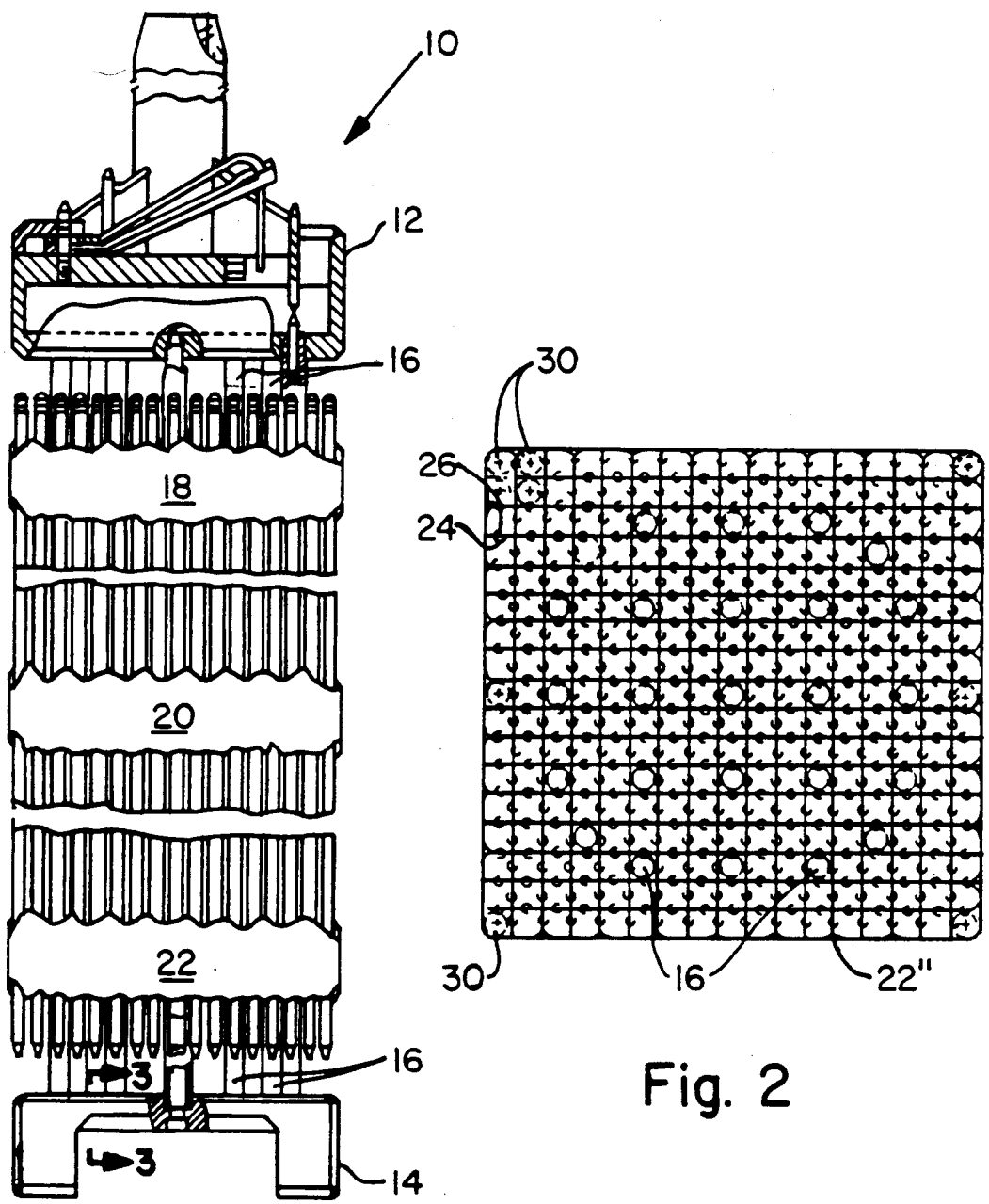
FIG. 1 is a side elevational side view of a nuclear fuel assembly of the type which permits lower end fitting fuel assembly reconstitution.
FIG. 2 is a schematic plan view of a typical fuel assembly grid with rod and guide tube cells.

DETAILED DESCRIPTION OF THE PREFERRED EMBODIMENT;

The numeral 10 in FIG. 1 generally designates a fuel assembly for a pressurized water nuclear reactor. The fuel assembly 10 includes an upper end fitting 12 and a lower end fitting 14 connected by a plurality of guide tubes or thimbles 16 for receipt of control elements in known manner.

Cell-defining spacer grids 18, 20 and 22 have fuel or poison rod support features in the form of arches 24 and opposing springs 26, in known manner, and are secured at spaced intervals to the guide tubes 16 with their cells in register. The fuel rods or poison rods 30 are dotted-in in FIG. 2.

Figure 3:
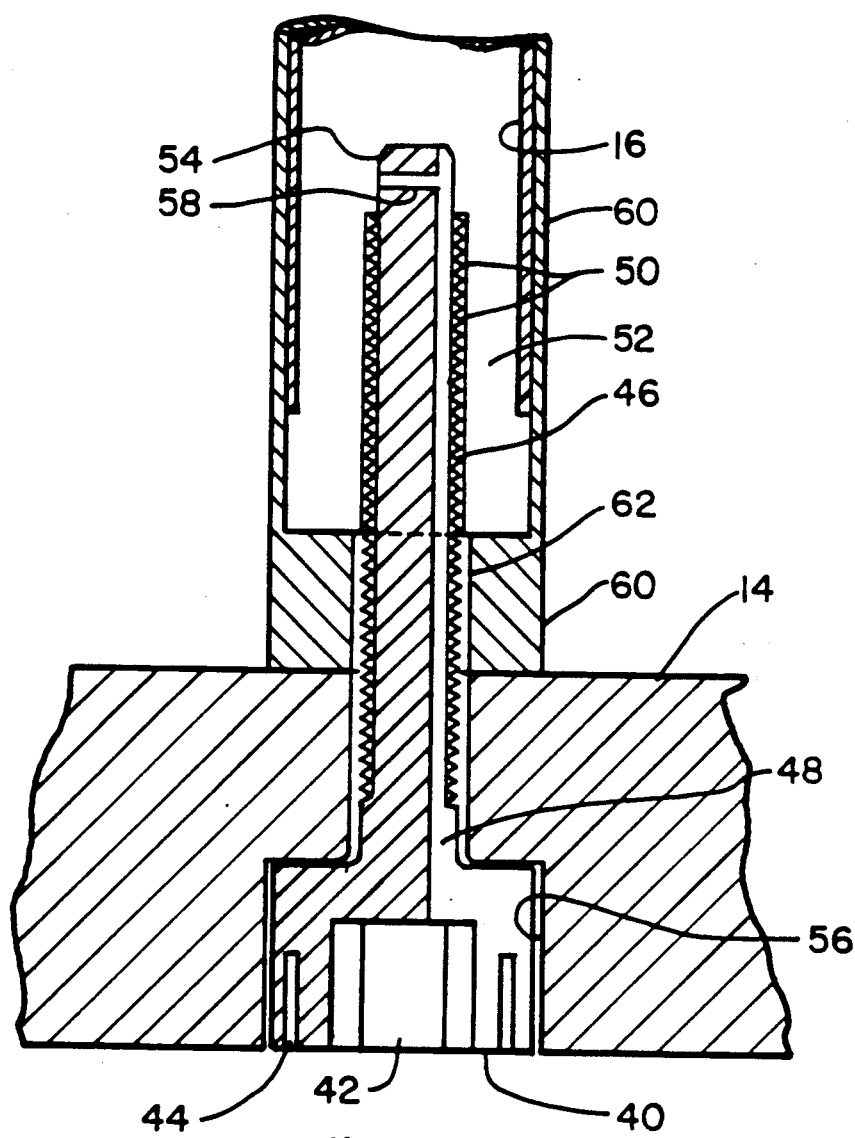
FIG. 3 is a fragmentary cross-sectional view taken along line 3—3 of FIG. 1 showing the zircaloy guide tube, zircaloy plug in the guide tube end, stainless steel cup, stainless steel fastener and a portion of the lower end fitting to which the guide tube is attached.
Figure 4:
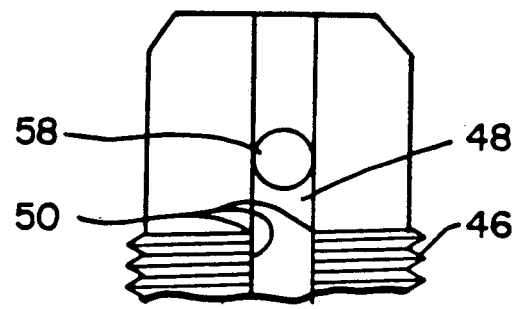
FIG. 4 is a fragmentary cross-sectional views taken along the line 4—4 of FIG. 3 showing a portion of the fastener thread and grooves.

The preferred embodiment of the invention is shown in FIGS. 3 and 4 in which the novel attachment of the zircaloy guide tube 16 to the stainless steel lower end fitting 14 is illustrated.

The main feature of the attachment is a fastener 40 in the form of a stainless steel bolt having a head 42 configured for receipt of a hex key or wrench for torquing. A peripheral slot 44 can be used for staking to lock the bolt 40 against rotation.

The shank of bolt 40 includes threads 46 through which a longitudinal slot or groove 48 is cut. The groove 48 creates a plurality of points 50 which tend to dig into mating threads in a zircaloy plug 52 having a threaded central passageway of threads mating with threads 46 to increase the frictional grip therebetween.

The slot or groove 48 of the stainless steel fastener 40 further provides "give" to avoid cracking of either the plug 52 or guide tube 16 due to thermal dimensional changes during temperature recycling in the reactor.

The end 54 of the fastener 40 opposite the headed end 42 and lower end fitting 14 into which it is countersunk in bore 56, has a transverse opening 58 in fluid communication with groove 48. This enhances coolant flow out of the guide tube 16 and flushes it, as well as giving it a "dashpot" or retarding function upon the insertion of a control rod.

Between the zircaloy plug 52 and zircaloy guide tube 16 is the bottom of a stainless steel tube receiving cup 60. The cup 60 extends upwardly a distance sufficient to permit the lower grid 22, which is of stainless steel, to be attached to it. The aperture or bore 62 or cup 60 permits passage of the stainless steel fastener 40 therethrough to accomplish the fastening function. Because it is of stainless steel, as is the lower end fitting and the fastener itself, the thermal expansion characteristics of these three elements are substantially the same, thus permitting a firm and secure attachment between them even during temperature cycling. The end zircaloy guide tube 16 and zircaloy plug 52 are "captured" even though their expansion characteristics are different from the stainless steel elements. They are held firmly because of the increased friction and "give" afforded to the threaded connection by means of the groove 48 and sharp points 50 it forms with the threads 46 and their engagement with the corresponding threads in the plug 52.

I claim:

1. In a nuclear fuel assembly which includes an upper end fitting and a lower end fitting spaced therefrom and connected thereto by a plurality of elongated guide tubes of one alloy having an open upper end and a closed lower end with spaced fuel element retaining grids mounted on the guide tubes therebetween, the closed lower ends of said guide tubes including a threaded central passageway and the attachment of said guide tubes to said lower end fitting of another alloy being characterized by:
   an externally threaded bolt with a first end threadably received in said threaded central passageway of the lower end of said guide tube and a head at the other end on the side of the lower end fitting opposite said guide tube;
   an interruption in the external threads of said bolt which forms a groove which communicates the interior of the guide tube with the side of the lower end fitting opposite said guide tube and enhances its frictional engagement with said threaded central passageway, thereby to hold and attach said guide tube and lower end fitting firmly together, even through a series of temperature cycles.

2. The attachment of said guide tubes to said lower end fittings of another alloy of claim 1 being characterized further in that said bolt is of substantially the same alloy as said lower end fitting.

3. The attachment of said guide tubes to said lower end fittings of another alloy of claim 1 being characterized further in that said bolt groove is a longitudinal cut made parallel to the bolt axis.

4. The attachment of said guide tubes to said lower end fittings of another alloy of claim 1 being characterized further in that said bolt includes an opening in its head.

5. The attachment of said guide tubes to said lower end fittings of another alloy of claim 1 which is characterized by said other alloy being stainless steel and said one alloy of said guide tubes being zircalloy.

6. The attachment of said guide tubes to said lower end fittings of another alloy of claim 5 further characterized by a zircalloy plug closing the lower end of said guide tubes and defining said threaded central passageway.

7. The attachment of said guide tubes to said lower end fittings of another alloy of claim 6 further characterized by a cup attached between the lower end fitting and the zircaloy guide tube by means of said bolt.

8. The attachment of said guide tubes to said lower end fittings of another alloy of claim 7 further characterized in that said cup is of stainless steel.

9. In a nuclear fuel assembly which includes an upper end fitting and a stainless steel lower end fitting spaced therefrom and connected thereto by a plurality of elongated guide tubes of a zircaloy alloy having an open upper end and a closed lower end with spaced fuel element retaining grids mounted on the guide tubes therebetween, the closed lower ends of said guide tubes including a threaded central passageway and the attachment of said guide tubes to said lower end fitting being characterized by:
   an externally threaded stainless steel bolt with a first end threadably received in said threaded central passageway of the lower end of said zircaloy guide tube and a head at its other end on the side of the stainless steel lower end fitting opposite said guide tube;
   an interruption in the external threads of said stainless steel bolt which forms a groove which communicates the interior of the zircaloy guide tube with the side of the stainless steel lower end fitting opposite said guide tube and enhances its frictional engagement with said threaded central passageway, thereby to hold and attach said zircaloy guide tube and stainless steel lower end fitting firmly together, even through a series of temperature cycles.

* * * * *